(No Model.)
J. B. CYPERT.
TIRE TIGHTENER.
No. 262,010. Patented Aug. 1, 1882.
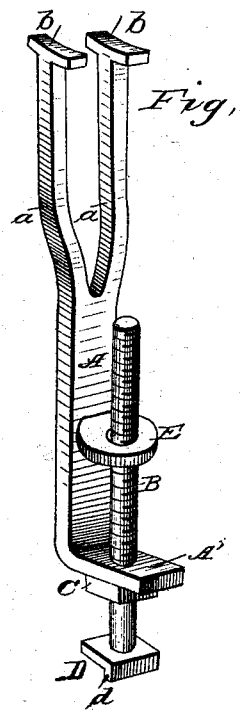
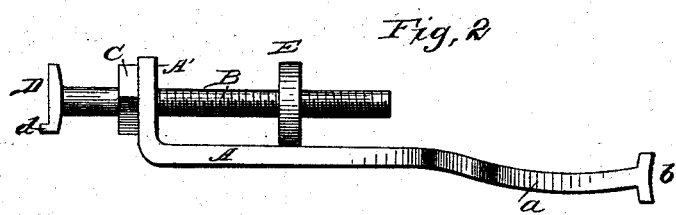
WITNESSES:
Fred. G. Dieterich.
Jno. W. Stockett.
Jesse B. Cypert,
INVENTOR.
by Lorus Bagger & Co.
ATTORNEYS.

United States Patent Office.

JESSEE B. CYPERT, OF WAYNESBOROUGH, TENNESSEE.

TIRE-TIGHTENER.

SPECIFICATION forming part of Letters Patent No. 262,010, dated August 1, 1882.

Application filed June 2, 1882. (No model.)

*To all whom it may concern:*

Be it known that I, JESSEE B. CYPERT, of Waynesborough, in the county of Wayne and State of Tennessee, have invented certain new and useful Improvements in Tire-Tighteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved tire-tightener, and Fig. 2 is a side view of the same.

Similar letters of reference indicate corresponding parts in both the figures.

My invention has relation to devices for tightening the tires of vehicle-wheels, &c.; and it consists in the detailed construction and combination of parts of a device or implement of that class, as hereinafter more fully described and claimed.

In the accompanying drawings, A represents the staff or brace of my improved tire-tightener, which is bifurcated at its lower end, with its feet $a\ a$ bulging outwardly and terminating in shoes $b\ b$. The upper end of the staff is bent at right angles, as shown at A', and has a screw-threaded aperture, through which is inserted the screw B, having a nut, C, and provided at its upper end with a fixed head, D, which has a lip, $d$, on one side. The lower end of the screw is inserted through a guide-collar, E, affixed to and projecting from the staff A below its projection A'.

To use this device for expanding and tightening tires, the shoes $b\ b$ are placed against the fellies so as to straddle the spoke opposite to the part to be tightened, and screw B is adjusted by turning the nut C, so that the head D may be placed against the hub, the lip $d$ being inserted between the band on the hub and the spoke to hold head D in place and prevent it from slipping or turning. By now screwing up the nut C the wheel is expanded, and may, with the adjacent fellies, be kept in the expanded position by inserting split washers, of leather or other suitable material, around the tenoned end of the spoke next to the felly. The guide sleeve or collar E insures a true motion of the screw in operating the device.

Having thus described my invention, I claim and desire to secure by Letters Patent of the United States—

The tire-tightener herein shown and described, consisting of the staff or body A, having screw-threaded projection A', and bifurcated bulging legs $a\ a$, provided with the shoes $b\ b$, and guide-collar E, in combination with the screw B, having nut C, and provided with the fixed head D, having the lip $d$, substantially as and for the purpose herein shown and described.

In testimony that I claim the foregoing as my own I have hereunto affixed my signature in presence of two witnesses.

JESSEE BUNDY CYPERT.

Witnesses:
PEYTON H. CRAIG,
HENRY A. HELTON.